(12) United States Patent
Klingeberg et al.

(10) Patent No.: US 12,091,594 B2  
(45) Date of Patent: Sep. 17, 2024

(54) THERMALLY SOFTENABLE STRIP AND METHOD FOR COVERING ELONGATED ARTICLES, IN PARTICULAR LINES

(71) Applicant: TESA SE, Norderstedt (DE)

(72) Inventors: Kerstin Klingeberg, Hamburg (DE); Heike Simonis, Hamburg (DE); Lars Guldbrandsen, Barsbuettel (DE)

(73) Assignee: tesa SE, Norderstedt (DE)

(*) Notice: Subject to any disclaimer, the term of this patent is extended or adjusted under 35 U.S.C. 154(b) by 235 days.

(21) Appl. No.: 17/637,608

(22) PCT Filed: Aug. 20, 2020

(86) PCT No.: PCT/EP2020/073398  
§ 371 (c)(1),  
(2) Date: Feb. 23, 2022

(87) PCT Pub. No.: WO2021/037688  
PCT Pub. Date: Mar. 4, 2021

(65) Prior Publication Data  
US 2022/0282126 A1    Sep. 8, 2022

(30) Foreign Application Priority Data

Aug. 23, 2019    (DE) .................. 10 2019 212 663.4

(51) Int. Cl.  
*C09J 7/35* (2018.01)  
*C09J 7/25* (2018.01)

(52) U.S. Cl.  
CPC ................. *C09J 7/35* (2018.01); *C09J 7/255* (2018.01); *C09J 2203/302* (2013.01); *C09J 2400/263* (2013.01); *C09J 2423/00* (2013.01); *C09J 2467/006* (2013.01)

(58) Field of Classification Search  
CPC ........ C09J 7/35; C09J 7/255; C09J 2203/302; C09J 2400/263; C09J 2423/00; C09J 2467/006; H01B 13/01281  
USPC ........................................ 156/334  
See application file for complete search history.

(56) References Cited

U.S. PATENT DOCUMENTS

| | | | |
|---|---|---|---|
| 9,365,748 B2 | 6/2016 | Husemann et al. | |
| 9,613,733 B2 | 4/2017 | Siebert et al. | |
| 11,680,189 B2* | 6/2023 | Klingeberg | C09J 7/35 |
| | | | 156/322 |
| 2015/0310968 A1 | 10/2015 | Murata et al. | |

FOREIGN PATENT DOCUMENTS

| | | |
|---|---|---|
| CN | 102356136 A | 2/2012 |
| CN | 105378017 A | 3/2016 |
| DE | 10 2013 213 726 A1 | 1/2015 |
| EP | 1848006 A2 | 10/2007 |
| EP | 2497805 A1 | 9/2012 |
| EP | 3019571 B1 | 5/2016 |
| JP | 2012110101 A | 6/2012 |
| JP | 5510282 B2 | 6/2014 |
| WO | 2015/004190 A1 | 1/2015 |

* cited by examiner

Primary Examiner — James D Sells  
(74) Attorney, Agent, or Firm — Norris McLaughlin, P.A.

(57) ABSTRACT

The invention relates to a strip for covering elongated articles, comprising a carrier in the form of a strip, characterized in that at least one side of the carrier in the form of a strip is provided with a plastic material that thermally softens at a temperature of preferably 100° C. to 135° C. and that comprises a thermoplastic material.

8 Claims, 2 Drawing Sheets

THERMALLY SOFTENABLE STRIP AND METHOD FOR COVERING ELONGATED ARTICLES, IN PARTICULAR LINES

This application is a 371 of International Patent Application No. PCT/EP2020/073398, filed Aug. 20, 2020, which claims priority of German Patent Application No. 10 2019 212 663.4, filed Aug. 23, 2019, the entire contents of which patent applications are hereby incorporated herein by reference.

The invention relates to a tape and to a method for jacketing elongated articles, more particularly cable harnesses.

Adhesive tapes have been used in industry for producing cable looms for some considerable time. The adhesive tapes are employed for bundling a multiplicity of electrical leads prior to installation or in an already assembled state, in order, for example, to reduce the space taken up by the bundle of leads, by bandaging them, and additionally to achieve protective functions such as protection from mechanical and/or thermal stressing. Common forms of adhesive tapes include film carriers or textile carriers, coated in general on one side with pressure-sensitive adhesives. Adhesive tapes for jacketing elongated articles are known from, for example, EP 1 848 006 A2, DE 10 2013 213 726 A1, and EP 2 497 805 A1.

Present-day cable harnesses swathed with adhesive tape are generally flexible. This flexibility is often undesirable, however, for technical reasons associated with manufacture. In manufacture, the cable ropes are generally prefabricated to a cable plan, and then inserted into the product that is to be equipped—such as automobiles for example. A cable harness plan corresponds to the actual three-dimensional disposition of the individual cable ropes in the cable harness—that is, which cable rope is bent at which angle and at which point; where positions of branches or outbindings are located; and with which connectors the ends of the cable ropes are fitted.

In order to hold the individual ropes of the cable harness in a defined shape, allowing them to be guided around the engine in the engine compartment, for example, without coming into contact with the engine, it is common practice to mount injection-molded components subsequently around the cable loom swathed with adhesive tape. A disadvantage of these injection-molded components, however, is that they entail additional material and additional assembly work.

WO 2015/004190 A1 discloses a method for jacketing elongated articles such as, in particular, leads or cable harnesses, wherein the elongated article is wrapped with an adhesive tape, with curable adhesive applied thereon, in a helical line or in an axial direction, and the adhesive applied on the adhesive tape is cured by supply of radiant energy such as heat. For the thermal curing in that case a temperature of 175° C. is employed.

A disadvantage with this method is the high curing temperature, which is of little practical ability in the assembly of cable ropes during the manufacturing operation in the automobile industry, for example. There is therefore a desire for adhesive tapes which can be activated at not more than 170° C., preferably not more than 135° C., or can be processed at elevated temperature and after cooling are rigid, allowing the wrapping of adhesive tapes to be integrated into the operation of manufacturing the cable looms or cable plans. There is also a preference for adhesive tapes which do not have to be activated on the elongated article, but are activated in a step beforehand, so that the cable rope does not come into contact with the activating heat. After curing has taken place, the adhesive tapes must have the requisite dimensional stability requirements. On the other hand, the adhesive tapes must not be activated or cure as early as during storage, since otherwise they can no longer be used. Lastly, the curing is intended to take place within the cycle time of the production operation (about 6 min).

The standard approach when processing heat-curable cable wrapping tapes to produce a cable rope is first to jacket the cable rope with the cable wrapping tape and then to activate the cable wrapping tape. A disadvantage with this approach is that not just the cable rope itself but also all ancillary components, such as temperature-sensitive plug connections, are exposed to thermal energy. Furthermore, the cable insulation on the cable rope may also be affected if high temperatures and long dwell times are needed in order to activate the cable wrapping tape, given that the temperature resistance of cable insulation is oftentimes only between 100 and 125° C.

There is therefore advantage in an adhesive tape which is activated with thermal energy prior to contact with the cable rope and which is subsequently used to wrap the cable rope, so that the cable rope does not experience any direct thermal energy. It is therefore possible to ensure that the cable insulation and other temperature-sensitive components remain intact.

It is an object of the present invention, therefore, to provide a tape for jacketing elongated articles that meets the requirements described above. A further object of the present invention is to provide a method for jacketing elongated articles using the rigid tape of the invention, and also a product obtainable with the method.

The solution proposed to the technical problem is a tape for jacketing elongated articles, comprising a tapelike carrier, characterized in that the tapelike carrier is provided on at least one side with a plastic which comprises a thermoplastic and which is thermally softenable at a temperature of preferably 100° C. to 135° C.

BRIEF DESCRIPTION OF THE DRAWINGS

The invention will now be described in greater detail with respect to the drawings, wherein.

Figure 1:
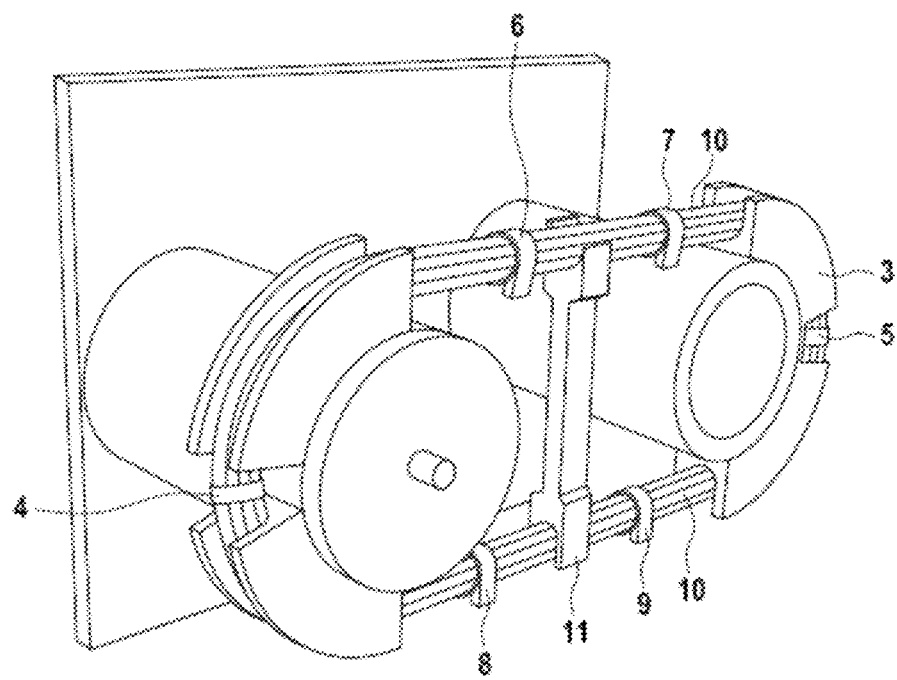
FIG. 1 is a schematic illustrating an apparatus for conducting a C-shape test for assessing cable stiffness at different temperatures.

According to one embodiment of the invention, the elongated article is a cable rope which comprises a bundle of multiple cables, such as 3 to 1000 cables, preferably 10 to 500 cables, more particularly between 50 and 300 cables.

Softenable plastic used may be any known thermoplastics and copolymers thereof such as polyesters, polyolefins, polyamides, polyacetals, polymers from the group of the styrenes, high-performance thermoplastics such as polyetherketones, polyamideimide and polysulfone.

The selection of the softenable plastic is dependent on the desired service temperature, activation temperature, and temperature stability during storage and transportation, and long-term service temperature.

Since temperatures of up to 100° C. are not infrequent on transportation routes, preferred plastics are those having a softening or melting temperature of >100° C., especially >120° C. A good combination of softening or melting temperature and rigidity is offered by the group of the polyolefins. The group of the polyolefins collects together polymers which are prepared from alkenes. The principal representatives are polyethylene (PE) and polypropylene (PP). Other members of the polyolefins are polymethylpentene (PMP), polyisobutylene (PIB) and polybutene (PB). Given the multiplicity of polymers and copolymers available on the market, the mechanical and physical properties can be adapted precisely to the requirement through the use of these polymers and copolymers and/or of mixtures and modifications of them.

It has proven advantageous to use polyethylene. Noteworthy with particular advantage are high-density polyethylenes (HDPE/PE-HD). HDPE grades having a melting range of 130-145° C. and an elasticity modulus in the range of 800-1500 MPa, preferably 900-1200 MPa, prove advantageous.

Also noteworthy advantageously is polypropylene. The requirement is met particularly, in terms of their mechanical and physical properties, by the copolymers of polypropylene with ethylene as comonomer. A melting or softening range of 130-145° C. and an elasticity modulus of 800-1500 MPa, preferably 900-1300 MPa, prove particularly suitable.

The thickness of the applied layer of softenable plastic is advantageously between 50 µm and 1000 µm, more advantageously between 100 µm and 750 µm, especially advantageously between 150 µm and 350 µm.

As carriers it is possible to use all known sheets and textile carriers such as drawn-loop knits, laid scrims, tapes, braids, needle pile textiles, felts, wovens (comprising plain, twill and satin weaves), formed-loop knits (comprising warp-knitted fabric and knitwear) or nonwovens, where "nonwovens" is to be understood as meaning at least textile sheetlike structures according to EN 29092 (1988) and also stitchbonded webs and similar systems. Particularly advantageous is a tape in which the carrier used is a woven, a nonwoven or a formed-loop knit. Carriers of these kinds are described for example in WO 2015/004190 A1, hereby referenced in its entirety.

A further possibility is to use spacer fabrics formed by weaving or formed-loop knitting, with lamination. Woven spacer fabrics of this kind are disclosed in EP 0 071 212 B1. Woven spacer fabrics are mat-shaped layered elements with a top layer comprising a fiber or filament web, a bottom layer and, between these layers, individual or bundles of holding fibers needled through the particle layer in a distributed form across the area of the layered element, and joining the top and bottom layers to one another.

Particularly suitable nonwoven fabrics are consolidated staple fiber webs, but also filament webs, meltblown webs and spunbonded webs, which usually require additional consolidation. Possible methods of consolidation known for webs are mechanical, thermal and chemical consolidation. Having proven particularly advantageous are webs consolidated in particular by overstitching with separate threads or by interloping. Consolidated webs of these kinds are produced for example on stitchbonding machines of the "Malimo" type from Karl Mayer, formerly Malimo, and can be purchased from companies including Hoftex Group AG.

The carrier used may additionally be a Kunit or Multiknit web. A Kunit web is characterized in that it originates from the processing of a longitudinally oriented fiber web to form a sheetlike structure which has loops on one side and, on the other side, loop feet or pile fiber folds, but possesses neither threads nor prefabricated sheetlike structures. A nonwoven web of this kind as well has already been produced for some considerable time on stitchbonding machines of the "Malimo" type from Karl Mayer, for example.

A Multiknit web is characterized relative to the Kunit web in that the web experiences consolidation on both the top and the bottom sides by virtue of the double-sided needle punching. Serving in general as a starting point for a Multiknit are one or two single-sidedly interloped pile fiber stitchbonded fabrics produced by the Kunit process. In the end product, the two facing sides of the fabric are shaped by fiber interloping to form a closed surface, and are joined to one another through fibers which stand almost perpendicular. It is possible additionally to incorporate further punchable sheetlike structures and/or scatterable media.

Also suitable, lastly, are stitchbonded nonwovens as a precursor to the formation of a carrier of the invention and a tape of the invention. A stitchbonded nonwoven is formed from a nonwoven web material having a large number of mutually parallel seams. These seams are formed by the stitched or knitted incorporation of continuous textile threads. For this type of nonwoven web, stitchbonding machines of the "Malimo" type from Karl Mayer are known.

Also particularly suitable are needlefelt webs. In a needlefelt, a fiber web is converted into a sheetlike structure by means of barbed needles. The needles are alternately punched into and pulled out of the material in order to consolidate it on a needle beam, with the individual fibers becoming entangled to form a firm sheetlike structure.

Also particularly advantageous is a staple fiber web, which in a first step is preconsolidated by mechanical working or which is a wet-laid web laid hydrodynamically, where between 2 wt % and 50 wt % of the fibers of the web are fusible fibers, more particularly between 5 wt % and 40 wt % of the fibers in the web. A nonwoven web of this kind is characterized in that the fibers are laid wet or, for example, a staple fiber web is preconsolidated by the formation of loops from fibers of the web, by needling, stitching, air and/or water jet processing. A second step is that of heat setting, where the strength of the web is further increased by the complete or partial melting of the fusible fibers.

Advantageously and at least regionally, the carrier has a single-sidedly or double-sidedly polished surface, preferably in each case a fully polished surface. The polished surface may be chintzed, as explained in EP 1 448 744 A1, for example. This enhances the dirt repellence.

Starting materials envisaged for the carrier are, in particular, (manmade) fibers (staple fiber or continuous filament) made from synthetic polymers, also called synthetic fibers, of polyester such as polyethylene terephthalate, polyamide, polyimide, aramid, polyolefin, polyacrylonitrile or glass, (manmade) fibers formed from natural polymers such as cellulosic fibers (viscose, modal, lyocell, cupro, acetate, triacetate, cellulon), such as rubber fibers, such as plant protein fibers and/or such as animal protein fibers and/or natural fibers of cotton, sisal, flax, silk, hemp, linen, coconut or wool. The present invention, however, is not confined to the materials stated; instead, recognizably for the skilled person with no inventive step required, it is possible to use a large number of further fibers to produce the nonwoven web.

Likewise suitable, furthermore, are yarns fabricated from the raw materials stated. In the case of woven fabrics or laid scrims, individual threads may be produced from a blended yarn, and thus may have synthetic and natural constituents. Generally speaking, however, the warp threads and the weft threads are each formed of a pure variety of yarn.

Polyester is used with preference as a material for the carrier, owing to the outstanding aging resistance and the outstanding media resistance with respect to chemicals and service fluids such as oil, gasoline, antifreeze and the like. A further advantage of polyesters is that of leading to a highly abrasion-resistant and temperature-stable carrier, this being particularly important for the specific end use for the bundling of cables in automobiles and, for example, in the engine compartment.

The basis weight of the textile carrier is advantageously between 30 g/m² and 300 g/m², more advantageously between 50 g/m² and 200 g/m², particularly advantageously between 50 g/m² and 150 g/m², very advantageously between 70 g/m² and 130 g/m².

According to one particularly advantageous embodiment of the invention, the carriers used comprise a polyester nonwoven or woven fabric which has a basis weight of between 50 g/m² and 150 g/m².

The ready-coated material is cut preferably into a width of 20±2 mm (any other width is likewise conceivable) and is wound spirally with an overlap of 50% around the shaped cable bundle. Softening of the plastic requires the application of a temperature of 130° C. to 150° C. for about 10 sec to 4 min. The temperature may be applied by hot air blower, IR emitter, oven, heating sleeve, or the like.

According to one preferred embodiment of the invention, the softenable plastic, after application to the carrier, has sunk into the carrier to an extent of more than 10%, preferably more than 25%, more preferably more than 50%. A numerical value of 25% here, for example, means that the softenable plastic has penetrated the thickness of the textile carrier over a layer thickness of 25%—that is, in the case of a carrier having a thickness of 100 μm, it has penetrated over a layer thickness of 25 μm within the carrier—beginning from the surface of the carrier coated with the softenable plastic, and in a direction perpendicular to the plane generated by the longitudinal and transverse directions, respectively.

Also provided by the present invention is a method for jacketing elongated articles such as, in particular, leads or cable harnesses, wherein a coated tape as claimed in any of the preceding claims is softened by the supply of heat at a temperature preferably between 110° C. and 150° C. and is subsequently guided in a helical line around the elongated article or the elongated article is wrapped in an axial direction by the tape, the elongated article together with the wrapping tape is brought into the desired disposition, more particularly into the cable harness plan, and the elongated article is held in this disposition until the tape has solidified again by cooling.

According to one embodiment of the invention, the thermal energy is applied over a period of 10 sec to 2 min, which is compatible with the cycle times of the manufacturing operation, and so the elongated article is fully cured after about 6 min as soon as it is installed in the target object such as automobiles, watercraft or aircraft.

According to a further embodiment of the invention, the thermal energy is supplied to the tape and maintained until the tape is guided around the elongated article and/or until it jackets the elongated article.

The tape is preferably wrapped spirally around the elongated article with an overlap of 30% to 70%, more preferably 40% to 50%, more particularly about 50%.

Figure 2:
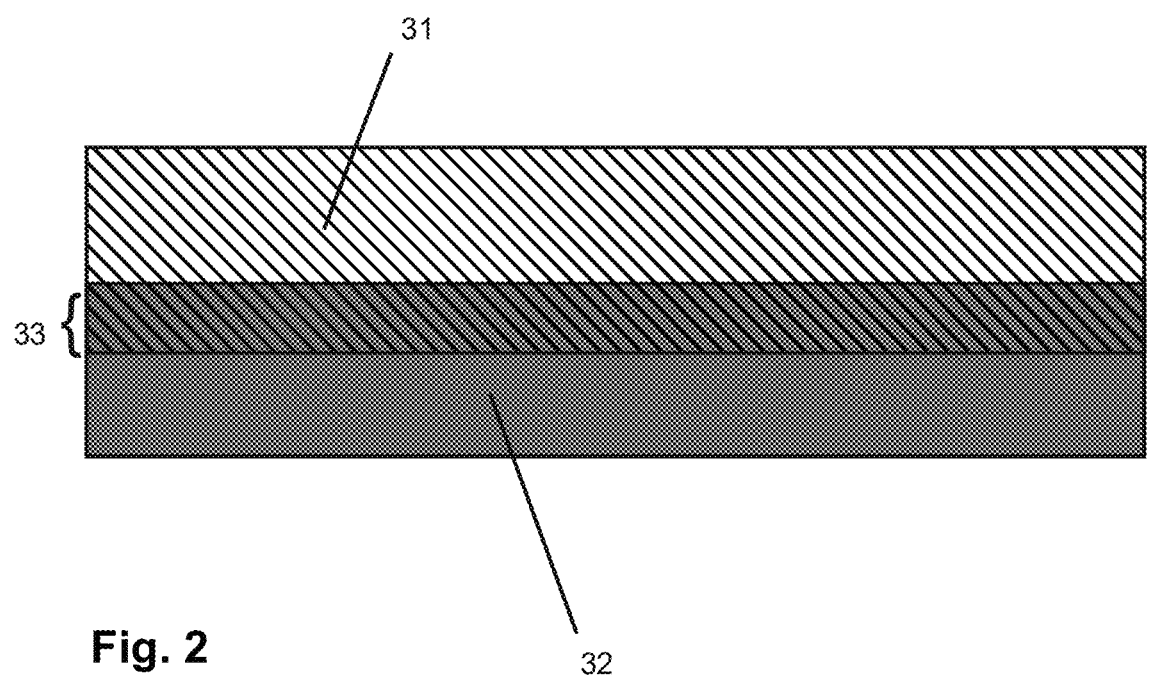
FIG. 2 is a cross-section of one embodiment of an adhesive tape of the present invention.

FIG. 2, in a section in the cross direction (cross section), shows the tape, which consists of a nonwoven carrier 31, applied on one side of which is a layer of a thermally softenable plastic 32 comprising a thermoplastic.

The plastic has sunk into the carrier to an extent of 25% (33), which results in optimal anchoring.

Lastly embraced by the concept of the invention is a jacketed elongated article, such as more particularly a cable harness, jacketed with a tape of the invention, and also a vehicle comprising an elongated article jacketed in this way.

EXAMPLES

Example 1—Production of a Coated Tape

A woven PET fabric carrier with a width of 20 mm, a thickness of 100 μm and a basis weight of 130 g/m² was laid down with polyethylene HMA 016 from ExxonMobil™ in a single-screw extruder using a temperature profile of 160° C. to 220° C. and the polyethylene was pressed into the woven fabric carrier in a calendar nip. With the aid of a roll at a conditioned temperature of 20° C., the material is cooled to room temperature and then wound into a bale.

Example 2—Bending Test for Ascertaining the Stiffness

A test specimen consisting of 250 individual leads with a lead cross section of 0.35 mm² was bundled using an adhesive tape 9 mm wide (tesa 51618) to form a specimen lead set, with the specimen lead set thus having a diameter of 23±5 mm and a length of 300±50 mm. This specimen lead set was wrapped spirally with the heated stiffening material from Example 1, and an overlap of 50% was ensured. The stiffening material was subsequently left to cool down to room temperature.

The cured specimen lead set was subjected to a bending test in order to determine the influence of the stiffening material on the stiffness. The bending test was performed on a tensile testing machine. For this test, the specimen lead set was placed onto two jaws with a spacing of 70 mm and pressed in centrally with a crosshead by a distance of 30 mm, and subjected to load. The force required for the deformation of the measurement travel was recorded by a tensile testing machine, in newtons. The testing velocity was 100 mm/min, both during loading and during unloading of the specimen lead set. The test was carried out at 3 different points on the lead set (start, middle and end). The bending force results from the mean value of the three individual measurements, and was evaluated in three categories as follows:

Evaluation categories, 3-point bending test:
+ highly suitable for the application (500-750 N)
O of limited suitability for the application (400-500 N and 700-800 N)
− not suitable for the application (<400 and >800 N)

For comparison, a commercially available adhesive tape, Tesa® 51036, was subjected to the same test. The results are set out in Table 1 hereinafter.

Example 3—C-Shape Testing for Ascertaining the Stiffness at Different Temperatures Ascertaining the stiffness of a bent cable specimen, a test method was developed (C-cable specimen bending test). To produce a C-cable specimen (see FIG. 1), a cable lead (10) with a lead cross section of 0.35 mm² is wound 100 times around a mount (1) to form a specimen lead set. The mount (1) has two opposite, semicircular guides (2, 3) with a diameter of 120 mm, which are spaced apart with a spacing (A) of about 210 mm. The wound cable harness is represented in FIG. 1.

The number of cable turns is 100. The resulting specimen lead set has a diameter of 15±5 mm and a perimeter of 690 mm. At the apices of the semicircle segments and at two linear sections (legs) in each case, the cable bundle (10) is tied together and fixed using cable ties (4, 5, 6, 7, 8, 9) with a tensile force of 210±10 N, so that after removal from the mount the cable bundle (10) possesses sufficient stiffness not to deform. To further improve the stiffness of the cable bundle (10), a support (11) is positioned between the legs of the cable bundle and is fixed likewise using cable ties.

The cable bundle (10) thus produced is removed from the mount and wrapped, with a 50% overlap, with the previously heated adhesive tape under test (width 19 mm-20 mm). Wrapping for this purpose is commenced at a cable tie (e.g., 6 or (7)) of the leg in the circle segment direction ((6)→(4) or (7)→(5)). When the wrapping reaches the cable tie (4) or (5) at the apex of the semicircle segment, this tie is removed and wrapping is continued up to the next cable tie ((4)→(8) or (5)→(9)) of the opposite leg. Exactly the same procedure is carried out on the other side, on the other semicircle segment.

The specimens thus prepared undergo the corresponding stiffening method (cooling down to room temperature). Using wire cutters, the specimens are cut adjacent to the remaining cable ties to give two "C-shaped" cable specimens (C-cable specimens), which each also have an unwrapped section on both sides of the semicircular wrapped section. The cut is made at the distance of the diameter (120 mm) from the apex of the semicircle segment, projected onto the circle center.

With one piece of cable respectively, loops are tied to the leg ends of the specimens, allow them to be hung up at one end and allow a weight to be hung on at the other end. The remaining cable ties are now removed, since they can distort the result of testing. The distance between the legs is now determined.

One of the two specimens is stored at room temperature and the other at 60° C.

A 1 kg weight is hung from the respective lower leg of the "C test specimen". After an hour, the deflection of the cable bundle is recorded (deflection behavior with 1 h at RT and, respectively, 60° C.) and the weight is removed. After one minute the deflection is determined again (resilience behavior with 1 min at RT or, respectively, 60° C.). After an hour the deflection is then determined again and recorded (resilience behavior with 1 h at RT or, respectively, 60° C.)

The values ascertained for the C-shape deformation were graded into three categories: highly suitable for the application, of limited suitability for the application, and unsuitable for the application. The categories were evaluated as follows:

Evaluation categories, C-shape bending test (room temperature):
+ highly suitable for the application (<15% deflection)
O of limited suitability for the application (>15-30%)
− unsuitable for the application (>30%)
Evaluation categories, C-shape bending test (60° C.):
+ highly suitable for the application (<25% deflection)
O of limited suitability for the application (>25-40%)
− unsuitable for the application (>40%)
Evaluation categories, C-shape bending test (resilience behavior at RT and 60° C.):
+ highly suitable for the application (<10% deflection)
O of limited suitability for the application (10-30%)
− unsuitable for the application (>30%)

For comparison a commercially available adhesive tape, Tesa® 51036, was subjected to the same test. The results are likewise set out in Table 1 hereinafter.

TABLE 1

| | 3-Point bending test | C-Shape deformation at RT | C-Shape resilience behavior at RT |
|---|---|---|---|
| Example 1 | + | + | + |
| tesa ® 51036 | − | − | − |

| | C-Shape deformation at 60° C. | C-Shape resilience behavior at 60° C. |
|---|---|---|
| Example 1 | + | + |
| tesa ® 51036 | − | − |

Key:
+ highly suitable for the application
o of limited suitability for the application
− unsuitable for the application

The invention claimed is:

1. A tape for jacketing elongated articles, comprising a tapelike carrier, wherein the tapelike carrier is provided on at least one side with a layer of plastic which consists of a thermoplastic and which is thermally softenable at a temperature of >100° C., wherein the thermoplastic is a polyolefin or a mixture of a polyolefin and another thermoplastic, and wherein the layer has a thickness between 50 µm and 1000 µm.

2. The tape as claimed in claim 1, wherein the carrier material comprises a polyester nonwoven.

3. The tape as claimed in claim 1, wherein the softenable plastic has sunk into the carrier to an extent of more than 10%.

4. A method for jacketing elongated articles, said method comprising softening a coated tape as claimed in claim 1 by supplying heat at a temperature between 130° C. and 150° C. and subsequently guiding the tape in a helical line around the elongated article or wrapping the elongated article in an axial direction with the tape, bringing the elongated article together with the tape into a desired disposition, and holding the elongated article in this disposition until the tape has solidified again by cooling.

5. The method as claimed in claim 4, wherein the softenable plastic is softened by the supply of thermal energy at a temperature of 110° C. to 140° C.

6. The method as claimed in claim 4, wherein the thermal energy is supplied over a period of 0.5 sec to 2 min.

7. A jacketed elongated article obtained according to claim 4.

8. A vehicle comprising a jacketed elongated article as claimed in claim 7.

* * * * *